United States Patent [19]
Hemmerich

[11] Patent Number: 5,492,708
[45] Date of Patent: Feb. 20, 1996

[54] TOOL AND PROCESS FOR THE FORMATION OF A PRETZEL

[76] Inventor: Werner Hemmerich, Hochhausergrund 14, DE 6987 Kulsheim-Eiersheim, Germany

[21] Appl. No.: 211,306

[22] PCT Filed: Jun. 18, 1993

[86] PCT No.: PCT/EP93/01556

§ 371 Date: May 31, 1994

§ 102(e) Date: May 31, 1994

[87] PCT Pub. No.: WO94/03068

PCT Pub. Date: Feb. 17, 1994

[30] Foreign Application Priority Data

Jul. 30, 1992 [DE] Germany .......................... 42 25 116.8

[51] Int. Cl.$^6$ .................................................. A21D 6/00
[52] U.S. Cl. .................... 426/499; 426/500; 426/512; 426/517; 425/323; 425/391; 425/403; 425/470
[58] Field of Search ....................... 426/499, 500, 426/512, 517; 425/323, 391, 403, 470

[56] References Cited

U.S. PATENT DOCUMENTS

| 223,917 | 1/1880 | Huber | 425/323 |
| 2,114,951 | 4/1938 | Young et al. | 425/323 X |
| 2,161,267 | 6/1939 | Young et al. | 425/391 X |
| 3,308,770 | 3/1967 | Groff | 425/391 X |

FOREIGN PATENT DOCUMENTS

| 1432965 | 9/1969 | Germany . |
| 2731997 | 1/1979 | Germany . |
| 3906310 | 9/1990 | Germany . |
| 4211043 | 10/1993 | Germany ....................... 425/323 |

Primary Examiner—Donald E. Czaja
Assistant Examiner—Milton I. Cano
Attorney, Agent, or Firm—Wolf, Greenfield & Sacks

[57] ABSTRACT

Tool for the formation of a pretzel blank from a strand of dough which takes the form of a molding pan having at least one slot on groove with a twisted and/or looped pattern, molded into its bottom, corresponding to the shape of a pretzel.

8 Claims, 4 Drawing Sheets

TOOL AND PROCESS FOR THE FORMATION OF A PRETZEL

BACKGROUND OF THE INVENTION

1. Field of the Invention

The invention concerns a tool for the formation of a pretzel blank from a strand of dough. The invention concerns, moreover, a process for the production of a pretzel blank from a dough strand utilizing this tool. Finally, the invention concerns an installation designed to make use of this tool.

2. Discussion of the Related Art

Known (European patent application 0 382 219) is a method for conveying preprepared dough strands between a receiving station, a knot-forming station and a releasing station, the ends of each dough strand being moved toward one another between the receiving station and the knot-forming station and the middle part and side portions of the dough strand dropped down below the ends to form a curved loop. At the knot-forming station this loop is rotated 360° with the aid of two brush rollers. The middle part and the end portions are then tilted upward into a horizontal position. The ends of each strand of dough, then dropped down, are caught between the flanks of two U-shaped, inwardly folded flanks of two grab belts, between the receiving station and the releasing station, and carried along in the direction in which the conveyer moves. This is supposed to permit a high output of pieces per unit of time as well as the delivery of dough strands to the receiving station at irregular intervals. This method for the formation of a pretzel blank requires however a lot of complicated machinery and is consequently liable to stoppages; in addition, the rotating brush rollers and/or dropping down or manual removal of the pretzel blanks from the conveyer belt do not reliably ensure the production of an always uniform pretzel blank.

A further known method (DE-OS 4,032,466) lays a strand of dough over a vertical, semicircular dough-strand holder. The ends of the dough strand are then seized and the adjacent end segments twisted together. The middle portion of the dough strand is then flipped into a horizontal position upon the dough strand ends. The dough strand ends, held in place on a horizontal support, are thereby moved outward and away from the central plane of the middle part of the dough strand, which lies on the dough strand holder. The dough strand holder, standing upright, is then rotated along with the middle part of the dough strand by 360°, to be flipped then into the horizontal position. This sequence, taking place in an essentially vertical direction, can easily produce a stretching or tearing of the strand of dough. Furthermore, in this case, too, the production of a uniform or even pretzel shape is not always assured.

Other machines for making pretzels are known (U.S. Pat. Nos. 1,669,277, 1,142,533) in which holding or gripping devices lay a dough strand over its ends on a flat processing plate and thus curl it into a pretzel shape around projecting forming pegs which pierce the processing plate at right angles. This necessarily produces pulling forces capable of reducing the quality of the dough structure. To move the curled dough strand further along off the processing plate, particularly to release it, the plate and the forming pegs must be designed to move toward each other, which requires additional drive mechanisms. Moreover, a precise implementation or maintenance of the desired or curved pretzel shape is not thus guaranteed.

SUMMARY OF THE INVENTION

The problem underlying the invention is therefore to make possible the production of a pretzel blank from a preprepared strand of dough with less machinery, permitting a gentle treatment of the dough strand and/or pretzel blanks of stable or uniform shape, while avoiding the disadvantages cited above. To solve this problem, it is proposed per the invention that the initially cited pretzel-forming tool be executed as a mold pan or plate with a raised side wall encircling the plate bottom, at least one slot or groove with a pattern being molded into the bottom, which is curved or bent according to the specified pretzel shape. Created with the invented tool is an extremely simply and cheaply constructed tool with which the dough strand can be easily brought into the desired pretzel shape. Several mold pans with the same basic shape, but with different groove patterns corresponding to the various pretzel shapes desired, can thus be kept on hand.

To expand the possibilities for the application of the invented mold pan, particularly with regard to automated pretzel making machines and/or pretzel shaping machines, one development of the invention provides that the pan bottom be pierced by a borehole; the hole or boring is expediently located near the pretzel knot and/or groove intersection and thus suitable to receive a drive shaft spindle on which it is possible, preferably by mechanical means, to rotate the mold pan for the purpose of looping over the dough strand, for example, to form a pretzel knot.

To prevent the dough strand from sticking in the mold pan, it is advantageous, per another development of the invention, to make the mold pan from plastic provided or coated with TEFLON.

Within the framework of the invention, the invented product/shaping tool can be utilized to produce a pretzel blank from a strand of dough by inserting the dough strand in the mold pan partly or in its entirety. In practical terms, this can be done by laying first the middle of the dough strand in the central portion of the groove, after it has been picked up by the ends either manually or mechanically, and then laying its ends in those groove segments which have thus far remained empty. To produce the familiar, regular pretzel shape, the central groove region forms the largest curved and/or looped portion of the groove.

In front of or behind the mold pan it is advantageous to provide a stop or baffle against which preferably the center of the dough strand is hit or bounced to permit it to fall easily at least in part from the stop into the groove.

Based upon the invention, it is possible to conceive the use of two mold pans with corresponding or identical groove patterns, the pretzel blank formed by the use of the first mold pan being inserted in the second with the shape orientation maintained. Shape-interlocking holds the blank with sufficient stability to permit the second mold pan to serve as a means of transport. A further benefit is based on the fact that the congruent topographies or three-dimensional structures of the two pan bottoms of the upper or, respectively, lower halves correspond to the desired pretzel shape, promoting uniformity in the pretzel shape produced.

To increase the degree of automation over the pretzel machines known thus far by structurally simple means and, in particular, to permit necessary manual interventions to be avoided to the greatest extent possible, a device for the use of the first and if necessary second mold pan is proposed within the scope of the present invention having the following functional components: a gripper system set up to take hold of the dough strand, means of adjustment serving to move and/or position the gripper system and/or one or more of the mold pans, a transport system to assume the function of conveying the dough strands into and/or out of the working area of the gripper system and/or of one or more of the mold pans, and means of control in communication with the other units for the purpose of coordinating their operations.

The advantage achieved by this installation, which serves as an automatic pretzel maker, is that the mold pan can be changed according to the pretzel shape desired and replaced by one with a different groove pattern. The one or more mold pans with their respective groove patterns permit a precise shaping and holding of the dough strand during the execution of rapid mechanical movements, without the need for supplementary manual interventions.

Suitable for the implementation of the gripper system are one or more electromagnetically activated grippers whose open or closed state and also location or position can be scanned by sensors connected to the control unit.

The positioning system is realized in a further development of the invention by the proposal of a number of linear guides, in parallel with the three orthogonal spatial axes, each being associated with one or more linear drive units. The linear guides can implemented, for example, in the form of a stationary or immovable rail with a carriage which glides along it. The linear drive unit can take the form, conceivably, of either hydraulic and/or pneumatic positioning cylinders or that of a stepper motor whose rotary movement can be converted to linear motion by means of a toothed-belt drive.

Each gripper is coupled with particular advantage to a linearly guided carriage which can be moved back and forth on a common rail of a single linear guide. The advantage is that the grippers can be synchronized with one another or moved symmetrically back and forth relative to one another by appropriate means of control. This promotes the uniformity and precision of the pretzel shape. There is furthermore the possibility of being able to operate both grippers for laying the dough strand in the pretzel groove mold with only a single linear drive.

To permit the positioning system, if necessary the associated gripping or other positioning elements, to be moved to any given point within the three-dimensional working area of the invented production machine by structurally simple means, a further development of the invention makes provision for the following structural features: the stationary part (for example, guide rail) of a first linear guide, preferably oriented in a vertical direction, is supported on a frame or chassis anchored, for example, to the factory floor; then, with particular advantage, the remaining linear guides, running parallel to the second or third spatial axis, are supported via their stationary part (for example, guide rail) on the movable part (for example, the carriage rolling or gliding on the guide rail) of the linear guides oriented along a different spatial axis. With the aid of this cascade-like arrangement of the linear guides running parallel with regard to the three spatial axes, it is possible with simple construction to move, for example, the grippers to any point within the three-dimensional working area of the device.

Appropriate for the realization of the control system is an obvious, freely programmable controller able to act upon the linear drive units and, if necessary, additional drive units (see below), in such a way that data can be entered into it for controlling the positioning and timing of the movement guides according to the pretzel shape desired.

Precision work and operational safety require that the moving parts, for example, the carriages traveling on the guide rails, be scanned, if the positioning system is provided with one or more limit switches; this enables positioning, locating and perhaps "Emergency Off" signals to be transmitted to the control system.

Particularly in conjunction with the hole or boring mentioned relative to the mold pan described above, a special development of the invented device consists of providing the positioning system with a rotatory system in which the mold pan is rotatably mounted—especially by means of the cited borehole—and connected to a rotary drive unit. It is thus possible for the control system, for example, the freely programmable controller to govern the speed of rotation, angle and/or timing of the rotating drive unit—according to the varying demands of production.

To ease removal of the pretzel blanks, provision is made in a further development of the invented device for a positioning system with one or more pivoting elements which engage a pivot control unit, which can be appropriately guided by the controller; carried by as well as rotatably or stationarily mounted in each pivot element is a mold pan which tilts on activation of the associated pivot drive unit and the ensuing circular movement of the pivot element, permitting the contained pretzel blank to drop out. This concept can be further develope into a comprehensive, complete shaping of both the upper and lower halves of the dough strand into a pretzel blank by the arrangement of two pivot elements, optional linked together at the chassis, in other words vertically and horizontally staggered, so that their respective mold pans will be positioned vertically above or below one another for a certain period of time on appropriate activation of the rotatory drive, the bottoms of the mold pans facing one another with congruent groove patterns due to the arc traced by the pans. It is thus possible to shape the contour of the pretzel blank, first one half with the first mold pan and then the other half with the other.

BRIEF DESCRIPTION OF THE DRAWINGS

Further details characteristics and advantages based on the invention emanate from the subclaims, the following description of preferred execution examples as well as with reference to the drawings. The drawings show in:

DETAILED DESCRIPTION

Figure 1:
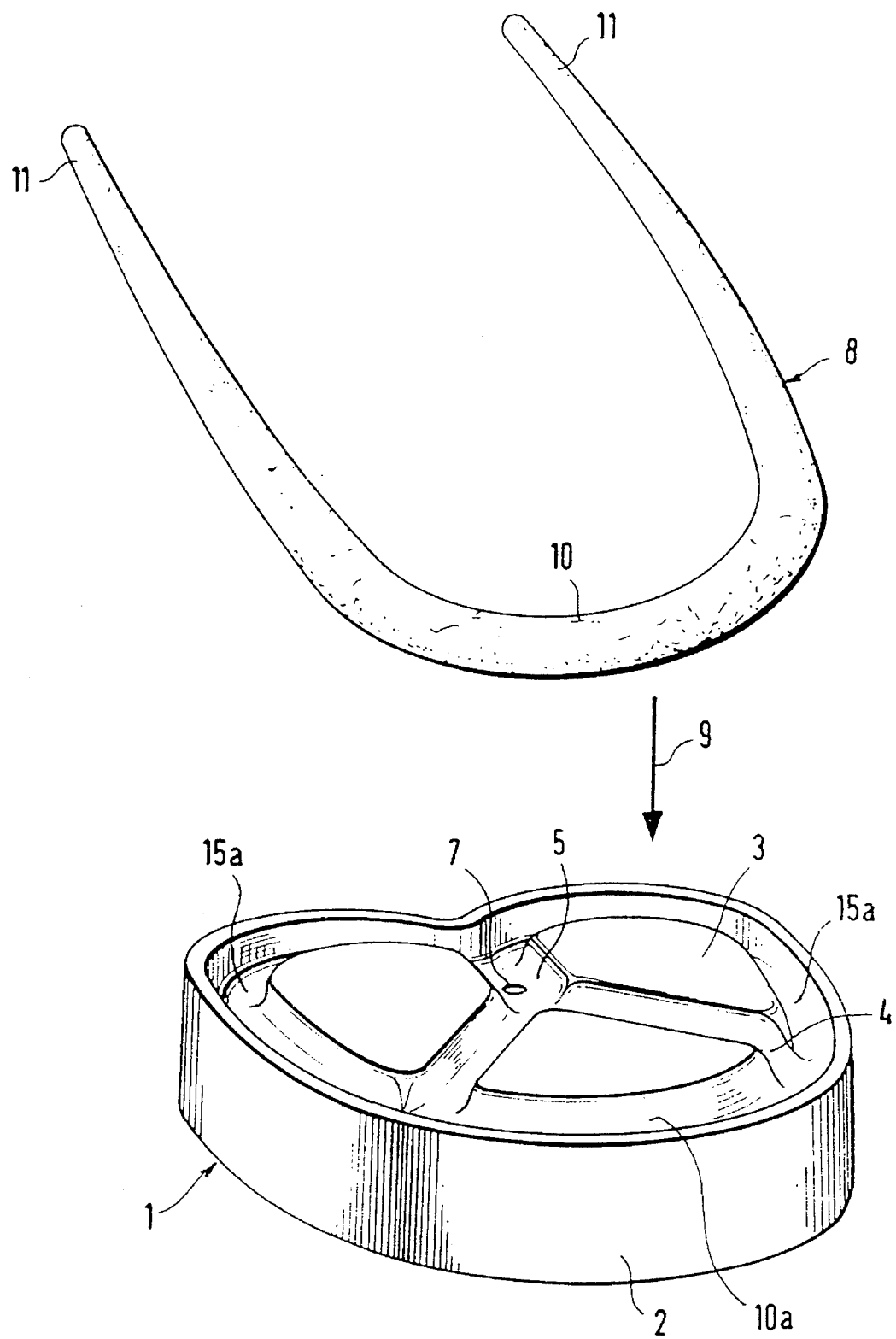
FIG. 1 a perspective view of an invented tool or mold pan, along with the dough strand to be inserted in it.

According to FIG. 1, the invented tool takes the form of a molding pan whose multiply curved or arched side wall 2 encircles the pan bottom 3. The pan bottom 3 is provided with a topography or three-dimensional structure corresponding to the desired pretzel shape by corresponding cavities which form a multiply curved, intertwined and mutually intersecting groove 4. The pattern of the groove 4 can per the invention vary according to the pretzel shape desired. In the region of the intersection 5, in which knots 6 (compare FIG. 2D) are usually formed in the case of all known pretzel shapes, the bottom 3, or groove 4, is pierced by a hole 7. This serves to receive the tip of the shaft of a rotatory drive unit (compare FIG. 3). Already positioned above the mold pan 1 is an already bent strand of dough 8, which eventually be laid in the groove 4 per direction of movement 9. As can be seen, the middle, large portion of the curve 10 of the dough strand 8 has a cross section thicker than that of the dough strand ends 11. As a result, the largest area of the pretzel arch 10 of the dough strand 8, in the groove section 10a immediately adjacent to the side wall 2 of the mold pan 1, can project outward by 2–3 mm in the crosswise direction.

Figure 2A:
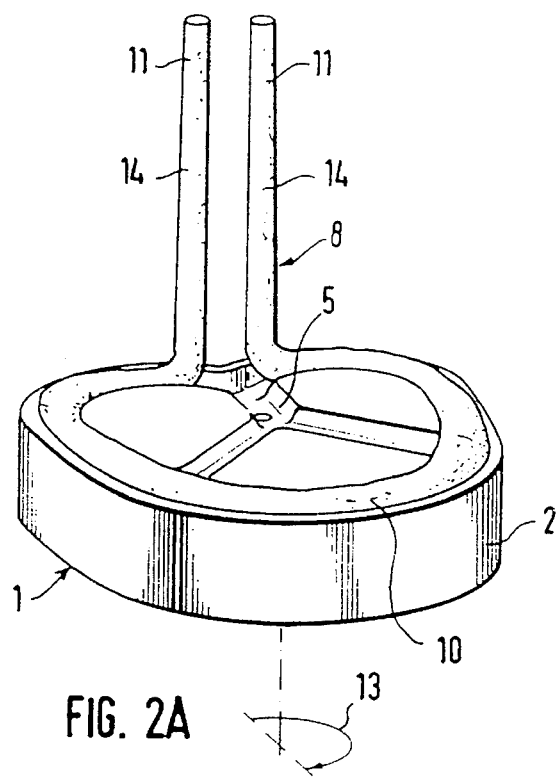
FIG. 2A–2D the method for utilizing the mold pan to form a pretzel blank, likewise in perspective.
Figure 2B:
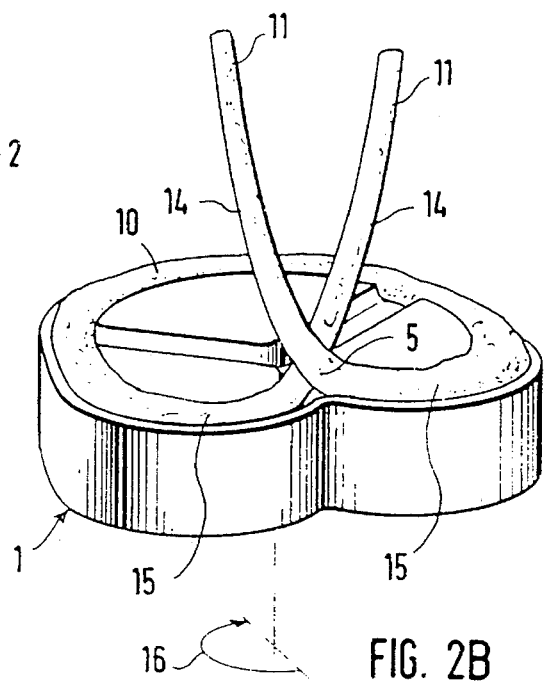
Figure 2C:
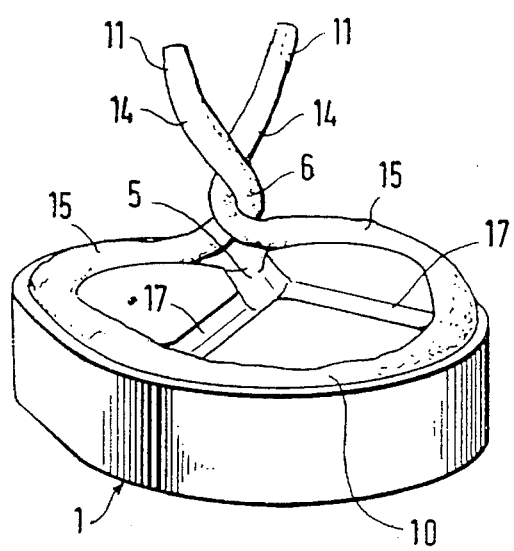

Described below is the process by which a pretzel blank 12 (compare FIG. 2D) can be formed using the mold pan 1: First of all, the dough strand 8 is grasped by its ends 11 and laid via its segment 10 with the largest radius in the associated, appropriately arched groove segment 10a—as illustrated in FIG. 2A. While the dough strand ends 11 are held up, the mold pan 1 is rotated approximately 180° in the clockwise direction per 13, finally assuming the position shown in 2B. The dough strand end segments 14 immediately adjacent to the dough strand ends 11— still being held up—are crossed. The remaining segments of the dough strand 8—large curved portion 10 and the smaller arch segments 15 immediately adjacent to it—are already fixed in the groove 4 in the crosswise direction, partly completely and partly protruding. Per FIG. 2B, the mold pan 1 then rotated an additional 180°, once more in the clockwise direction 16 so that the dough strand end segments 14 are multiply intertwined and form the knot 6—still held up—as illustrated in FIG. 2C. The region of the crossing point 5 as well as the angled segment 17 of the groove 4 are still empty. Then—in the second step in the process—the dough strand knot 6 and its end segments 14 are lowered into these groove segments, the dough strand ends 11 being pressed down onto the exposed surface of the dough strand 8, at the largest part of the arch 10.

Figure 3:
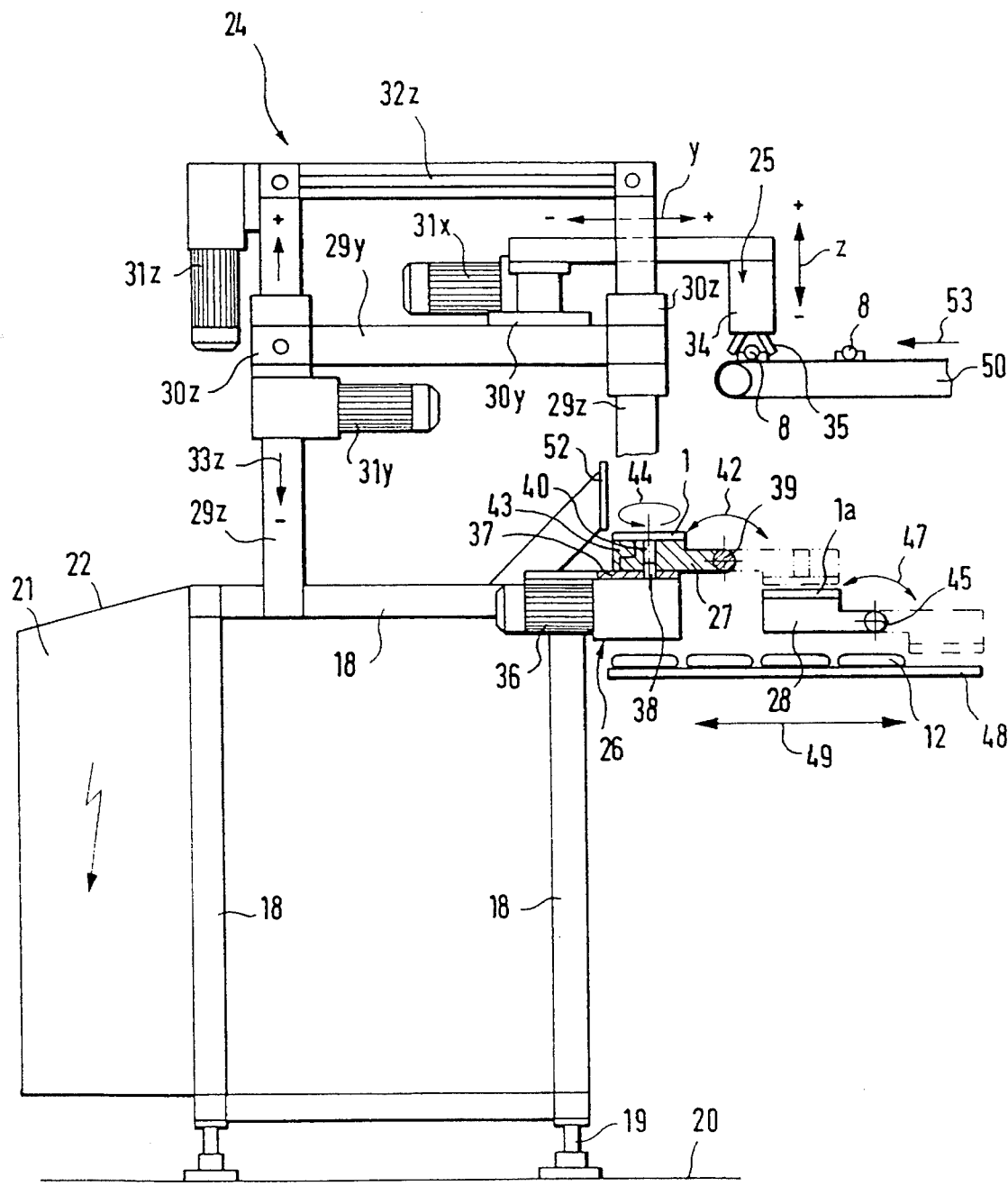
FIG. 3 a partially sectional side view of the invented installation for the production of pretzel blanks.
Figure 4:
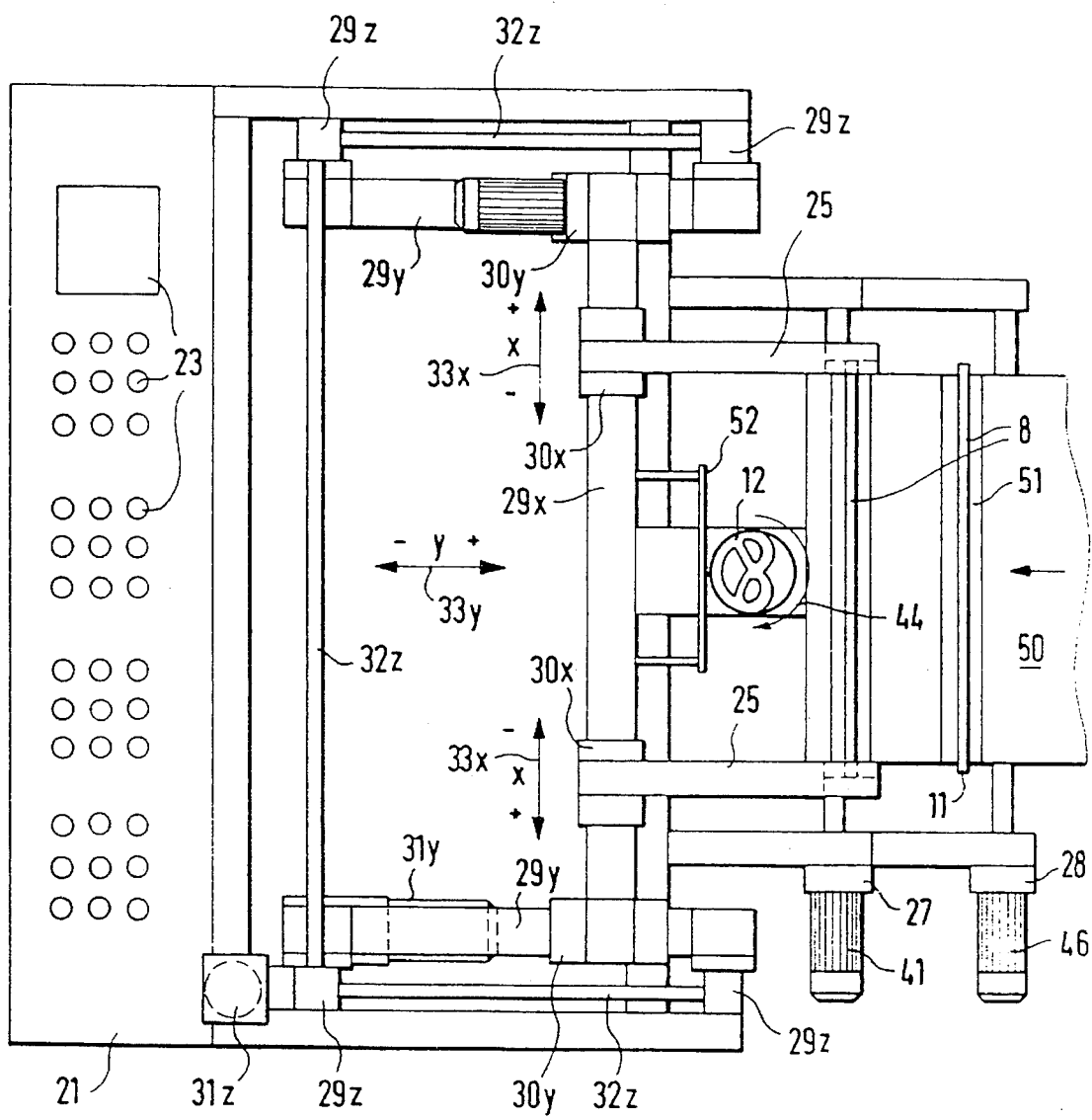
FIG. 4 a view of this device from the top.

According to FIG. 3 and 4, the invented installation comprises among others, as an automatic pretzel maker, the following assemblies: a stand 18, which rests on the floor 20 via height-adjustable feet 19 and/or lockable casters (not shown); a cabinet 21 for the circuitry at the side of the stand 18, held in place for example, by screws, and with an inclined control panel 22 at the top exhibiting the various input, output and other control and/or display elements 23 (shown schematically in FIG. 4); a freely programmable control unit (not shown) mounted in the circuit box 21, which can be started, queried, etc. via the controls 23; a gripper-positioning system 24, supported at the bottom by the top of the stand 18; electromagnetically controllable grippers 25, which can be moved by Knit 24, for dough strands 8, a rotary system 26 for the mold pan 1 positioned on it; and a first pivoting element 27 and a second pivoting element 28, each with a mold pan 1 or 1a.

The gripper-positioning system 24 consists of three linear positioning units, permitting±movements along each of the three orthogonal spatial axes x, y, z. The linear positioning unit in the z-axis (parallel or vertical with regard to the plane of the drawing in FIG. 3 or 4) consists—to achieve optimal stability—of four linear guides, each exhibiting a guide rail 29z, screwed onto to the stand 18, and a positioning carriage 30 capable of moving along it. The carriage can also be moved up and down (±) in a direction vertical relative to the quadrilateral guide rails 29z. The linear positioning unit z is moreover equipped with a stepper motor drive 31z, whose rotary output is converted into linear up/down motion ±33z, in each case along one of the four linear guides, via drive shafts 32z (not illustrated) and toothed-belt drives.

The linear positioning unit is supported in the horizontal y-direction (parallel to the planes of the drawings in FIG. 3 and 4) by the linear positioning unit z mounted on the stand 18, its guide rail 29y and its drive motor 31y being attached to the positioning carriage 30z of the linear positioning unit z. The linear positioning unit y exhibits two commercially available, parallel linear guides with guide rails 29y, operating in a horizontal plane, on which positioning carriages 30y run, driven by toothed-belt drives and the associated drive shafts, which are powered in turn by the associated drive motor 31y—in analogy with the manner described for linear positioning unit z.

The linear positioning unit in the x-direction (vertical relative to the plane of the drawing in FIG. 3 and parallel to the drawing plane of FIG. 4) has a linear guide with a single guide rail 29x, each end of which is permanently attached to a positioning carriage 30y on the linear positioning unit in the y-direction. Moving along the thus mounted guide rail 29x are two positioning carriages 30x, driven by an associated stepper drive motor 31x in the same way that power is applied in the other linear positioning directions x, y. The two positioning carriages 30x are coupled together on the common guide rail 29x, and to the associated drive motor 31x, in such a way that they run synchronously away from each other (+) or toward one another (−) (cf. linear movements 33x).

At least one terminal switch (not shown) is attached to at least one linear guide 29, 30 in the case of all linear positioning units z, y, x, which indicates to the freely programmable controller in the circuit box 21 the execution, for example, of an emergency off command. The respective stepper drive motors 31z, 31y, 31x communicate with the freely programmable controller, for example, by means of electrical, digital pulses able in particular to contain data on the path and speed of movement, as well as the timing of the same. The freely programmable controller can compare these values to nominal values and, if necessary, make any adjustments needed to permit pretzels of the most diverse sizes and dough-strand patterns to be formed with technical precision and flexibility.

One of the electromagnetic grippers 25 is screwed onto each of the two positioning carriages 30x of the linear positioning unit in the x-direction. They each consist of a screw-mounted carrier arm 34 and a screw-mounted scissoring lever gripper 35, with an electrical draft magnet, hanging down from it. Each gripper 35 is equipped with a sensor for the OPEN-position and for the CLOSED- position, which transmit electrical pulses to the freely programmable controller in the circuit cabinet.

The rotary system 26 is screwed to the stand 18 and provided with a stepper motor rotation drive 36, a holding plate 37 and, passing through the latter, and upwardly projecting drive shaft spindle 38. By means of the freely programmable controller it is possible to set or freely program the rotation speed, torque and timing of the drive shaft spindle 38 connected to the rotary stepper motor drive.

The first pivoting element 27 pivots on the first stationary pivot axis 39, for example to the stand 18. It exhibits a pivoting mount 40 for the mold pan 1 and a stepper motor tilt drive 41 which initiates the tilting movements 42 of the first pivoting element 27 on the first pivot axis 39. It is thereby possible for the pivoting element 27, along with the mold pan 1 rotatably mounted on it, to be swung onto the pivoting unit 26 the second pivoting element 28 with the second mold pan 1a (indicated in FIG. 3 with hatching). Both positions can in addition be scanned with limit switches connected to the freely programmable controller. If the first pivoting element 27, is swing toward the pivoting unit 26, the drive shaft spindle 38 will enter the boring 7 of the first mold pan 1 producing a rotating coupling between the rotatory motor 36 and the first mold pan 1. Furthermore, the pivoting mount 40 coordinates with a locking system 43 which either holds or secures the mold pan 1 against rotation 44 or releases it to allow rotation 44. The locking system 43 is designed in such a way that the engagement of the drive shaft spindle 38 in the mold pan boring 7 is accompanied by a mechanical release, that is to say, the first mold pan 1 is released for rotation 44. If the first stepper motor tilt drive 41 swings the first pivot element 27 onto the second pivot element 28 (indicated in FIG. 3 with hatching), the locking system unit 43 is activated by means of a spring (not shown) and the first mold pan 1 is locked in position, so that rotation 44 can no longer take place.

The second pivoting element 28 is attached by means of a second pivot 45, also for example To the stand 18. A second stepper motor pivot drive 46 can impart a swinging movement 47 to it on the second pivot axis 45, causing the second mold pan 1a, rigidly attached to it with screws, to swing either into a position to receive a pretzel blank 12 from the first mold pan 1 swung over it, or into a position from which the pretzel blank 12 will be able to drop onto an outgoing conveyer belt 48 beneath the two pivot elements 27, 28 (indicated with hatching in FIG. 3).

The direction 49 in which the outgoing conveyer belt 48 moves—as well that of the incoming conveyer 50 belt to the grippers 25— is parallel with respect to spatial axis y. Crosswise grooves 51 are provided on the incoming conveyer belt 50 to hold the strands of dough 8 of the incoming conveyer belt in their crosswise direction or that of their movement. The dough strands 11 project above these grooves and can thus be snatched by the grippers 25. The latter beat especially the middle segment or curved portion 10 of the dough strand 8 on the sheet metal stop or baffle 52, which—viewed from the direction of the incoming conveyer 53—is arranged immediately behind the first mold pan 1 or the associated pivot unit 27. The incoming or outgoing conveyer belts, 50 or 48, can be synchronized according to a certain, controlled working tempo, which likewise governs the activities of the grippers 25 and the pivot elements 27, 28.

The sequence of operations of the automatic pretzel twisting device according to FIG. 3 and FIG. 4 shall now be explained below:

The two grippers 25 seize the two projecting ends 11 of a dough strand 8 on an incoming conveyer belt 50. Via the positioning system in the z-direction, the grippers 25, with the strand of dough 8, move vertically upward, +z, by for example 80 mm. By means of the positioning system in the y-direction, the grippers 25 are then moved back by about 200 mm, -y, towards the baffle 52. At the same time, the two positioning carriages 30x of the positioning system in the x-direction move together in direction -x by about 150 mm. The curved portion 10 of the dough strand thereby hangs down and hits the baffle 52 with its lowermost part. The grippers 25 now move toward one another once more, via the coupled positioning carriages 30x, by approximately 100 mm, -x, at which point the largest part of the arch 10 and the smaller curved segments 15 of the dough strand 8 already begin to lie in the first mold pan 1, per direction of movement arrow 9. The distance separating the grippers 25 at that point is still about 110 mm. Approximately at least 80 mm of the length of the largest curved area 10 dough strand 8 in the corresponding groove segment 10a of the mold pan 1. The grippers are now moved forward by about 80 mm, that is, in the +y-direction and simultaneously downward, that is, in the -z-direction. The dough strand 8 thereby comes to lie, particularly the small curved portions 15, deeper in the mold pan 1. The grippers 25 are then moved again further toward one another by about 40 mm, in the -x-direction, and further down in the -z-direction. This causes the largest arched portion 10 and the small curved segments 15 of the dough strand to lie nearly completely in the associated parts of the groove 4 of the mold pan 1, the two small curved segments 15 nearly touching each other. The grippers are now moved back by approximately 30 mm in the -y direction, as well as further downward in the -z direction. While retaining the movement components parallel to the y spatial axis without further changes, the grippers 25 are now moved only downward in the -z-direction. The mold pan 1, after the locking device 43 in the first pivoting element 27 has been released, is now rotated per 44 by 360°. The drive shaft spindle 38 or boring 7 thereby lie precisely in the axis of rotation, or in the region of the pretzel knot 6. The grippers 25 are now moved apart by about 40 mm, in the +x-direction. At the same time, they are moved back in the -y-direction by about 30 mm and further down in the -z-direction.

Figure 2D:
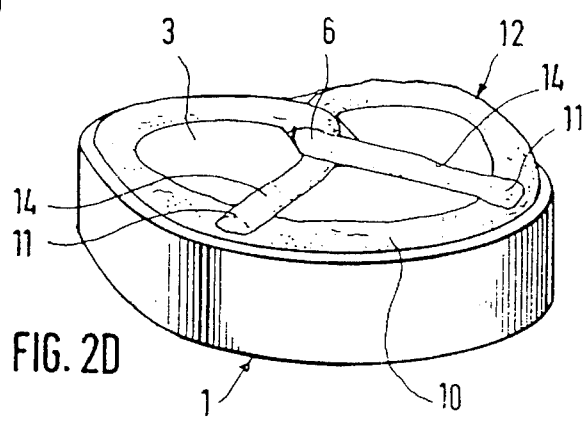

The grippers, grasping the dough strand ends 11, now stand above the two separated points on the large pretzel arch area 10, where the ends are to be pressed down (compare FIG. 2D). The scissoring lever grippers 35 are opened, so that the dough strand ends 11 drop onto the points on the large curved area 10 of the dough strand 8 where they are to be pressed down. The scissoring lever grippers 35 are closed and moved downward in the -z-direction, so that they press the dough strand ends 11 onto the open surface of the curved region 10 of the dough strand.

The grippers 25 are then moved upward (+z-direction), apart (+x-direction) and forward (+y-direction) in the direction opposite to that of the incoming dough strand 53, to enable the next dough strand 8 in the crosswise groove 51 of the incoming conveyer belt 50 to be picked up. Created at the same time is the free space for the movement of the first pivoting element 27, which is then caused by the rotary system 26 to swing or tip over the second mold pan 1a in the second pivot element 28. As soon as the pan bottom 3 with groove 4 of the first mold pan 1 is facing directly opposite to the, if necessary, congruent groove pattern of the second mold pan 1a of the second pivot element 28 (as indicated in FIG. 3 by hatching), the dough strand 8 or pretzel blank 12 already formed according to the groove pattern is able to drop into the second mold pan 1a in the second pivot element 28. The first pivot element 27 is then swung by its associated stepper motor pivot drive 41 back along the arc or tilt path 42 to the pivot unit 26, the rotation 44 of the first mold pan 1 again being released by releasing the locking mechanism 10, the rotatory motor 36 being able to engage the first mold pan 1 by means of the drive shaft spindle 38. A tipping movement 47 is now imparted to the second pivot element 28 by means of its associated pivot drive stepper motor 46 in such a way that the bottom of the second mold pan 1a lies facing the surface 48 of the outgoing conveyer belt 48; the pretzel blank 12, the second half of its cross section now if necessary also having been shaped, now falls onto the outgoing conveyer 48 and is transported further, in direction 49 of the conveyer, in the next action cycle. The second pivot element 28 is then swung back again from the position indicated with broken lines in FIG. 3 into the starting position (drawn with solid lines), and the next working cycle can already begin, if at least the first pivot element 27 is brought into engagement with the pivot unit 26 by mechanical release of the locking mechanism 43.

What is claimed is:

1. A tool for the formation of a pretzel blank from a strand of dough comprising:

a configuration as a molding pan with a pan bottom and a raised side wall encircling the pan bottom, an uninterrupted slot or groove on an upper surface of the raised wall, with a shape corresponding to that of a pretzel being formed into the pan bottom, the uninterrupted slot of groove having a central groove region wherein the central groove region corresponds to the largest curved area of the pretzel blank, a borehole in the region of a groove intersection point, the groove intersection point defining a region of the pretzel knot and means for rotating the mold pan rotatably connected to the mold pan through the borehole, the rotating means rotatably mounted in an axis of rotation perpendicular to the upper surface of the raised wall.

2. Tool according to claim 1 wherein the tool comprises a plastic material, and the upper surface of the mold pan is optionally coated with TEFLON.

3. Tool according to claim 1, wherein a depth of the groove, in a region corresponding to the largest arch of the pretzel, is dimensioned relative to the thickness of a dough strand in such a way that the dough strand, positioned in the groove, extends partly out of the groove in a crosswise direction, only in said region.

4. A process for the production of a pretzel blank from a dough strand segment having first and second ends and a middle section having a cross sectional area larger than the ends comprising the steps of:

providing a tool comprising a configuration as a molding pan with a raised side wall encircling a pan bottom, a borehole in a region of a groove intersection point, an uninterrupted slot or groove on an upper surface of the raised side wall, with a shape corresponding to that of a pretzel formed in the pan bottom and a central grooved region wherein the central groove region corresponds to the middle section of the dough strand segment;

laying the middle section of the pretzel dough strand on the central grooved region in the bottom pan;

forming a closed dough strand loop on the molding pan, having a portion of the dough strand ends at least held in an upright position, to a point where the dough strand ends cross each other in the region of the groove intersection point;

rotating the mold pan along with the dough strand segment, maintaining the strand end in the upright position being prevented form turning, forming a knot in the region of the groove intersection; and laying down the dough strand ends to complete the pretzel shape.

5. Process according to claim 4, wherein one of a baffle and stop is used against which the dough strand is struck and bounced and from whence it drops at least partially into the groove.

6. Process according to claim 4, wherein the ends of the dough strand are pressed against a part of the dough strand already positioned in the groove.

7. Process according to claim 4, further comprising the step of using a second mold pan in the bottom or groove of which the pretzel blank formed in the first mold pan is inserted, true to shape, for further transport.

8. Process according to claim 7, wherein topographies relative to at least one of three-dimensional structures and groove profiles of the bottoms of the first and second mold pan correspond respectively to the shape of the upper or respectively lower half of the pretzel shape.

* * * * *